United States Patent [19]

Miyazaki

[11] 4,078,228

[45] Mar. 7, 1978

[54] LOOP DATA HIGHWAY COMMUNICATION SYSTEM

[75] Inventor: Seiichi Miyazaki, Wakou, Japan

[73] Assignee: Ohkura Electric Co., Ltd., Tokyo, Japan

[21] Appl. No.: 667,415

[22] Filed: Mar. 16, 1976

[30] Foreign Application Priority Data

Mar. 24, 1975 Japan .................................. 50-35205
Jul. 24, 1975 Japan .................................. 50-90962
Aug. 25, 1975 Japan ................................ 50-102127

[51] Int. Cl.$^2$ ........................................... H04Q 11/00
[52] U.S. Cl. ............................ 340/147 R; 179/15 AL
[58] Field of Search ...................... 179/15 AL, 15 BF; 340/147 R

[56] References Cited

U.S. PATENT DOCUMENTS

| 3,924,077 | 12/1975 | Blakeslee | 179/15 AL |
| 3,925,621 | 12/1975 | Collins | 179/15 AL |

Primary Examiner—Harold I. Pitts
Attorney, Agent, or Firm—Sherman & Shalloway

[57] ABSTRACT

A plurality of data stations are connected in series by a "transmission line" to form a loop data communication system through which signals are transmitted unidirectionally. The transmission of the data is effected by using an information block containing two frames A and B as one unit. A central data station among the plurality of data stations is constructed to retransmit the received contents of frame A by frame B. The transmitting data station transmits the information by inserting it in frame A and an addressed data station receives the content of frame B.

10 Claims, 15 Drawing Figures

LOOP DATA HIGHWAY COMMUNICATION SYSTEM

BACKGROUND OF THE INVENTION

1. Field of the Invention

This invention relates to a data communication system so as to form a loop data highway system.

2. Technical Considerations and Prior Art

In a loop data highway system in which a plurality of data stations are connected in series by a common transmission line to form a so called highway. The transmission request signals for the highway, concurrently generated by a plurality of data stations must be multiplexed or processed on a time sharing basis. Generally, the time sharing system in which definite time slots are allocated to a data station by prefixing addresses to the information has a higher transmission efficiency and flexibility than a time division multiplex system in which identical time slots are fixedly allocated to the data stations. For this reason, the former system has also been applied to data communication systems having relatively small scale data processing fields. The system performance can be improved greatly by adopting a priority control over the transmission requests generated for the same time slot by a plurality of data stations. A station generating a transmission request having the highest priority level is permitted to use the time slots and a priority level may be given in accordance with the state of transmission request.

Where information is transmitted according to a fixed time slot defined by a central data station, the central data station receives the information in time slots accompanied with a loop delay of propagation, that include the information that must be retransmitted at the next time slots. As the loop delay variation is mainly caused by the length of the highway and the length is differs in accordance with different systems the loop delay consequently varies for different systems. Accordingly, it is necessary to add an additional delay in order to get the proper time for retransmission at the central data station.

SUMMARY OF THE INVENTION

According to this invention there is provided a data communication system, wherein a plurality of data stations including a central data station are connected in series in a loop data highway so that the signals are transmitted unidirectionally through the loop. An information block including two frames of time slots is generated and sent out from the central data station and is transmitted to all local data stations. The information block a block synchronizing signal, a first frame and a second frame. Each of the stations includes means for inserting information to be transmitted into the first frame. Each station thus transmits it and includes means for receiving the content of the second frame's information. The central data station includes means for retransmitting the content of the information of the first frame received from the highway at the second frame.

The loop data highway communication system controls the transmission on the basis of time division multiplex. In the central data station, if the total delay time for retransmission, including the loop delay time, can be made within one frame, the information block that comprises one transmission unit is made up of two frames A and B. Transmission information which includes the address of the transmitting data station is inserted in frame A, and the retransmitted information from frame B is received by a receiving data station which is free from adjustment of the timing delay.

According to this invention communication is divided into transmission and receiving modes thus simplifying the procedure of transmission, where a plurality of data stations make transmission requests in the same information block, the priority of the request are determined thus selecting only one data sation having the highest priority to operate thus making an orderly transmission and improving the transmission system performance.

Furthermore, means are provided means to check the synchronism, status and means for isolating a defective station or replacing a faulted common interface between stations, thus preventing the system from breaking down and minimizing the damage to the system caused thereby.

BRIEF DESCRIPTION OF THE DRAWINGS

Further objects and advantages of the invention can be more fully understood from the following detailed description taken in conjunction with the accompanying drawings in which:

FIG. 2b shows the waveforms of the synchronizing signal in the information block shown in FIG. 2a;

DETAILED DESCRIPTION

Figure 1:
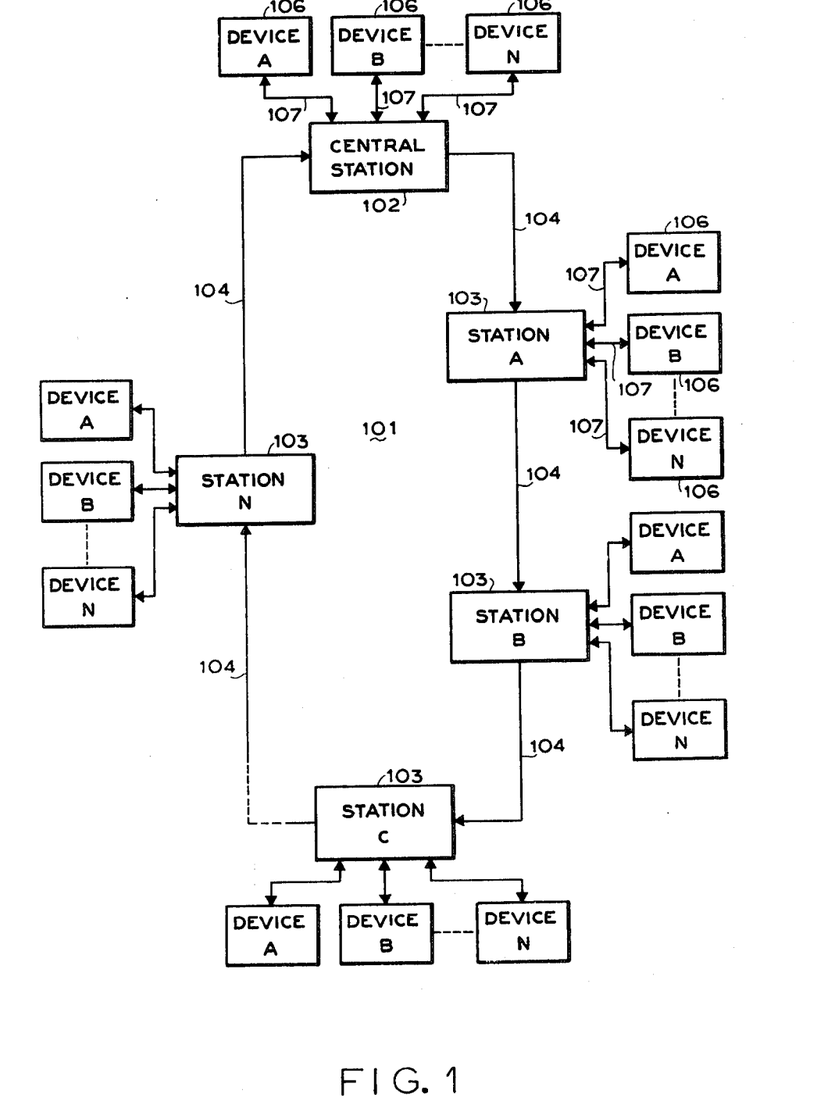
FIG. 1 is a block diagram showing a loop data highway system to which the transmission system of this invention is applicable.

Referring now to the accompanying drawings, FIG. 1 shows a so-called loop data highway system 101 wherein a central data station 102 and a plurality of local data stations 103 are connected in series through a common transmission line 104 called a "highway" such that signals are transmitted unidirectionally as shown by arrows. The highway 104 is made up of a pair of twisted contactors and the highway signal takes the form of a biphase encoded bit serial signal. In this example, the data transmission rate is 1 M bits/sec. and the biphase encoding clock sygnal has a frequency of 2 MHz.

Each of the stations 102 and 103 is constructed to pass or block highway signals so as to transmit information and at the same time to receive information from the highway. Each data station is connected to a plurality of devices 106 associated with the station through bidirectional buses 107 which transfer byte parallel signals so as to effect bit serial to parallel conversion, bit parallel to bit serial conversion, as well as to effect interfacing as will be described hereafter.

In addition to all functions of the other stations 103, the central data station 102 can originate timing signals, control the loop transmission delay and send out a specific code signal for the purpose of governing the highway 104 as a whole. Therefore, the central data station 102 may be separated, if wished, into the loop control station and a data station similar to that of local station 103. A common interface belongs to each station and usually a plurality of common interfaces are provided. Where transmission requests are made simultaneously by a plurality of common interfaces, one of the common interfaces is selected in accordance with a predetermined priority and such processing is made as designation of an address required for transmission and reception, data buffering and answerback.

Each device 106 has either an input or output function or both an input and output function. A specified control means is provided on the side of each device 106. Each device 106 is also connected to common interface through a device interface.

The transmission of the information is made on the basis of a time division multiplex (TDM) mode utilizing an information block as one unit. All stations and common interfaces of the transmission system have one of two modes, i.e., a transmission mode or a receiving mode. The term "transmission mode" means a mode in which either one of the interfaces transmits information to the highway through a bidirectional bus and a data station whereas the term "receiving mode" means a mode in which a common interface receives information from the highway through a data station and a bidirectional bus.

Figure 2A:
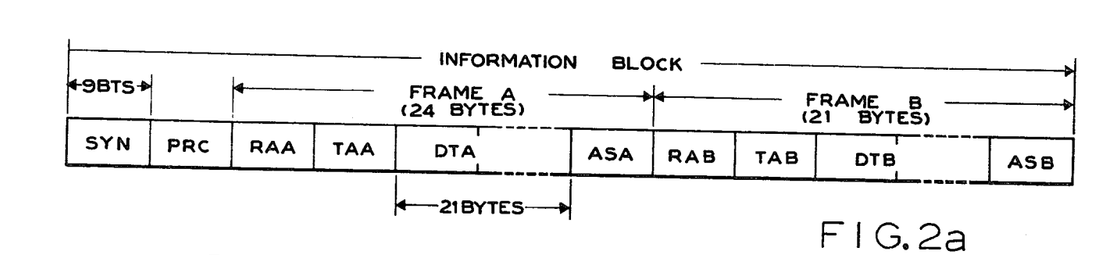
FIG. 2a is a diagram showing one example of an information block format that can be used in the transmission system of this invention.

FIG. 2 shows one example of the format of an information block transmitted through the highway. Exchange of the information is possible between any data stations and the blocking or formation of time slots is done in the central data station 102. The formed block is sent out continuously and thus the local stations 103 station are synchronized to the bit clock of the central data stations 102.

Figure 2B:
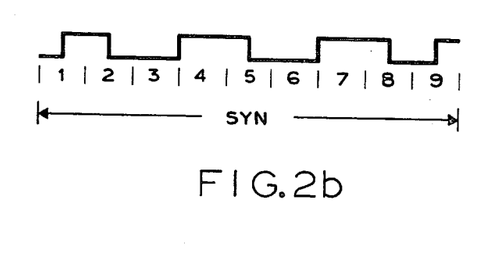
Figure 2C:
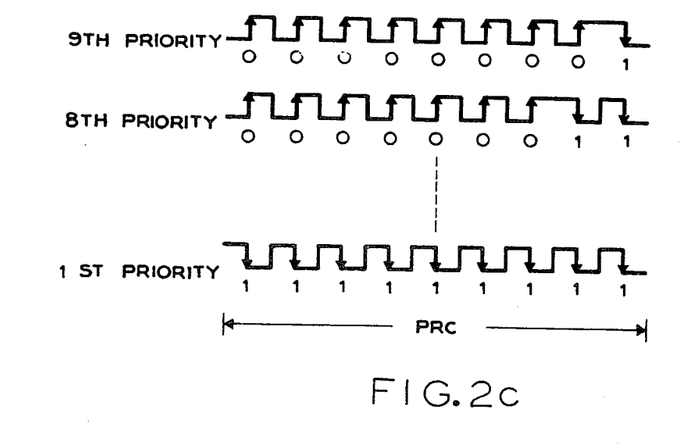
FIG. 2c shows the waveform of a priority signal.

In FIG. 2 a symbol SYN designates a synchronizing signal (one example of the waveform thereof is shown in FIG. 2b) having a length of 9 bits. The SYN signal can be distinguished from other signals because it forms a transmission signal of a special pattern which does not meet with the biphase encoding rule. In addition, SYN is used for the identification of information blocking. Symbol PRC shows a priority control having a length of 9 bits, permitting the allocation of a corresponding information block when simultaneous transmission requests occur. Simultaneous transmission requests are requests for the same information block from a plurality of common blocks. The priority control signal has a waveform as shown in FIG. 2c according to a predetermined priority level.

Frame A comprises 16 slots utilized to insert information except ASA and comprises four time slots RAA, TAA, DTA and ASA. Time slot RAA represents a receiving address of a common interface which are destinated to receive the information of frame B and has a length of 9 bits. Time slot TAA represents a transmission address representing a common interface that transmits the information of frame A and has a length of 9 bits. Time slot DTA shows information to be processed by a device 106 (FIG. 1) interfaced by the common interface. A portion of this information may be used for address expansion, block sequence number, retransmission flag and block check byte in addition to being used as the information required by a designated device. Time slot ASA represents answer-back information inserted by a common interface addressed by time slot RAA.

Frame B is used as the time slots that receive information except ASB and all common interfaces are in the receive mode. The information in frame B is replica of the information, in frame A which has been transmitted by a central data station 102. Therefore, time slots RAA, TAA, DTA and ASA of frame A correspond to time slots RAB, TAB, DTB and, respectively, of frame B.

Figure 3:
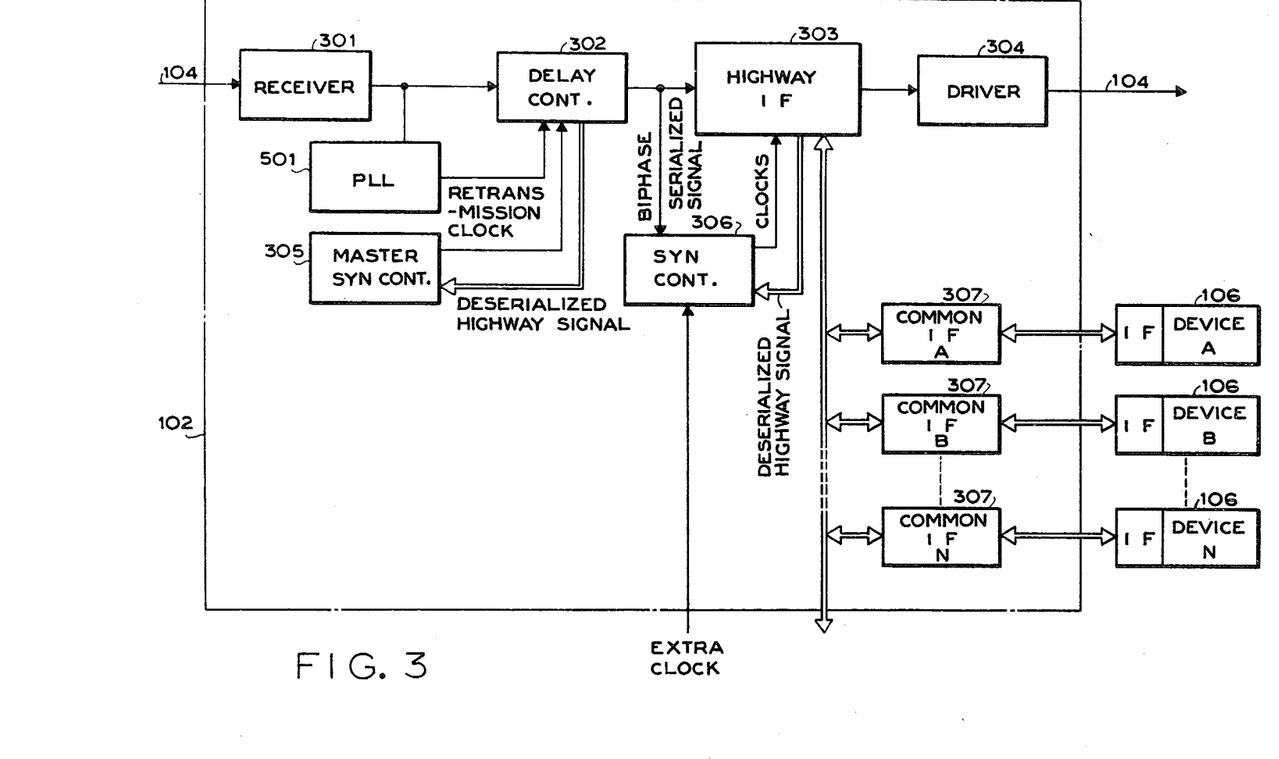
FIG. 3 is a block diagram showing the central data station of the transmission system shown in FIG. 1.

A typical construction of the central data station 102 is illustrated in FIG. 3. A highway signal 104 is received by a receiver 301, the output of which is delayed by a delay controller 302 and then applied to a highway interface 303 where insertion or by-passing of highway information is made, if desired. The information of frame A is transmitted over the highway 104 via a driver 304. The control of the delay time of the delay controller 302 is performed under the control of a master synchronization controller 305 and the synchronization of the highway interface 303 is controlled by a synchronizing signal from a synchronization controller 306. A plurality of common interfaces 307 are connected to the highway interface 303 and each common interface 307 is connected to a device 106. Details of the delay controller 302, synchronization controller 306 and highway interface 303 will be described later.

Figure 4:
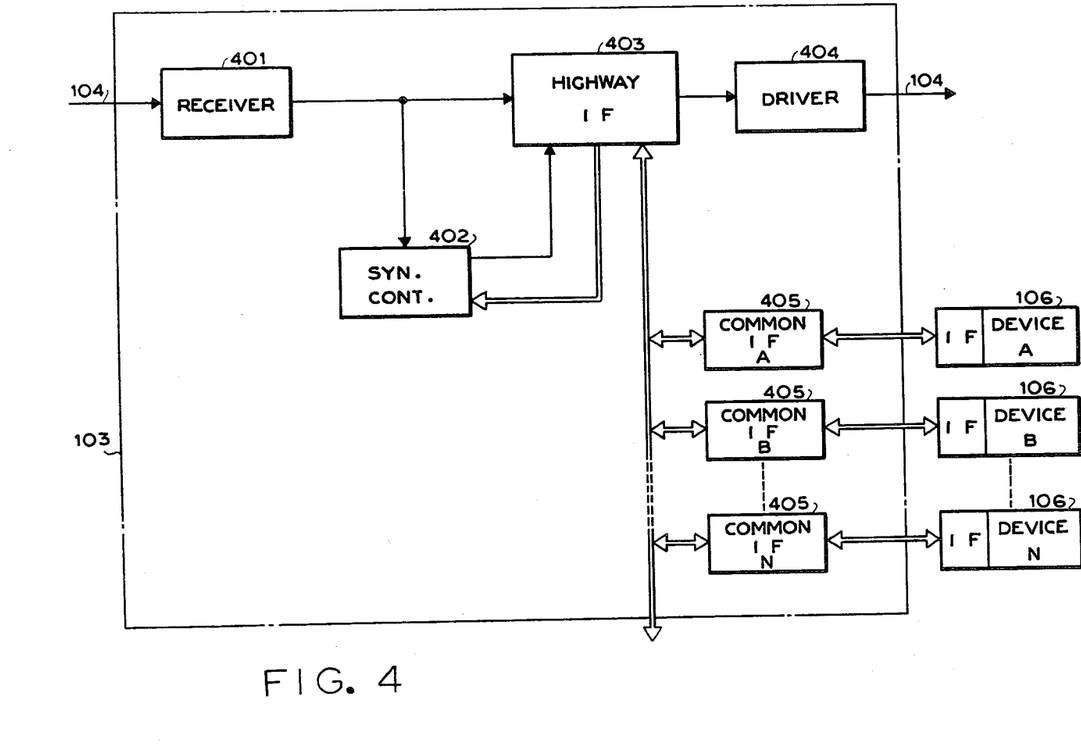
FIG. 4 is a block diagram showing the local station.

As shown in FIG. 4 each local data station 103 comprises a receiver 401, synchronization controller 402, a highway interface 403, a driver 404 and a common interface 405 and has the same construction as that of the control data station 102 shown in FIG. 3 except for the delay controller and the master synchronization controller.

Figure 5:
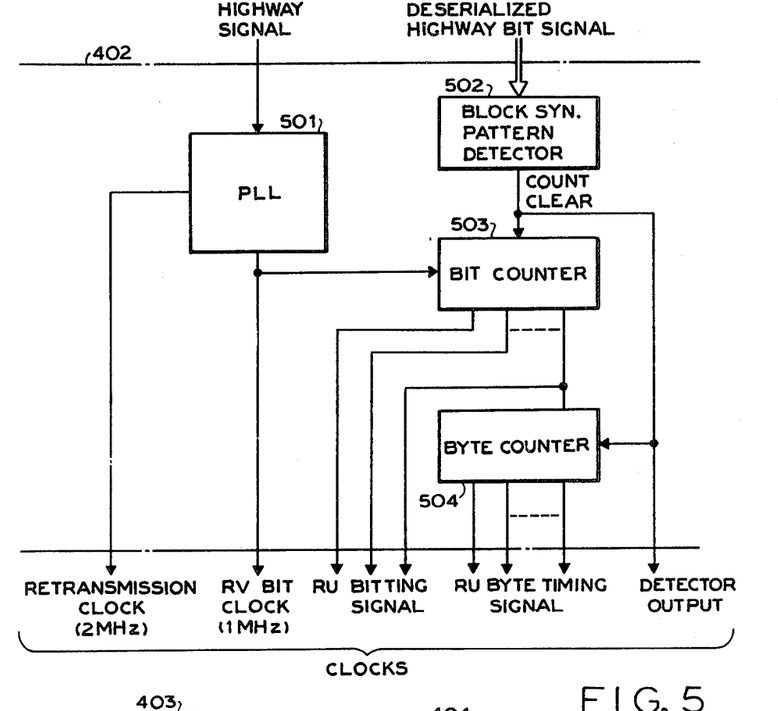
FIG. 5 is a block diagram showing the synchronization controller of the station shown in FIG. 4.

A preferred construction of the synchronization controller 402 is shown in FIG. 5. As has been described above, the highway signal has the form of biphase in which the level transitions from "1" to "0" and "0" to "1" are made by a biphase encoding clock signal. Accordingly, the phase transition signal retrieved from the biphase encoded signal has a clock information and it is possible to gain a noise free clock signal from a phase lock loop circuit (PLL 501) which is controlled by the highway signal. The phase lock loop circuit PLL 501 is used to produce a biphase encoding clock signal having a frequency of 2MHz and a bit clock signal having a frequency of 1MHz, which is obtained by frequency division of the retransmission clock signal.

A block synchronizing pattern detector 502 is connected to receive the output of 0 to 11 bits pits of a bit deserializer 801 (see FIG. 8) (18 bits of shift register) storing the highway signal sampled by a biphase encoding clock signal, and continued to detect the block synchronizing signal by comparing said inputs with a preset equi-block synchronizing signal pattern thus generating a detector output.

A bit counter 503 generates a carry signal each time it counts up 9 bits of receiver bit clock signal (1 MHz) and is connected to be reset with the detector output from the block synchronizing pattern detector 502. The bit counter 503 is constituted by nine bits shift register and only one bit of an "1" level is circulating thus able to produce "1" output successively at respective bits of the shift register which are utilized to locate a bit among the byte.

A byte counter 504 receives the output of the 9th bit which is applied as a carry bit to the bit counter 503 and to count the carry output for counting the number of bytes at each information block. The byte counter 504 is connected to be cleared by the detector output of the block synchronizing pattern detector 502. Similar to the bit counter 503 the byte counter 504 also includes shift register and its output is used to locate a byte among the information block.

All local data stations 103 are controlled to synchronize with central data station 102 with a definite propagation time delay determined mainly by the highway length with respect to the master synchronization controller 305 (FIG. 3) of the central data station 102.

Figure 6:
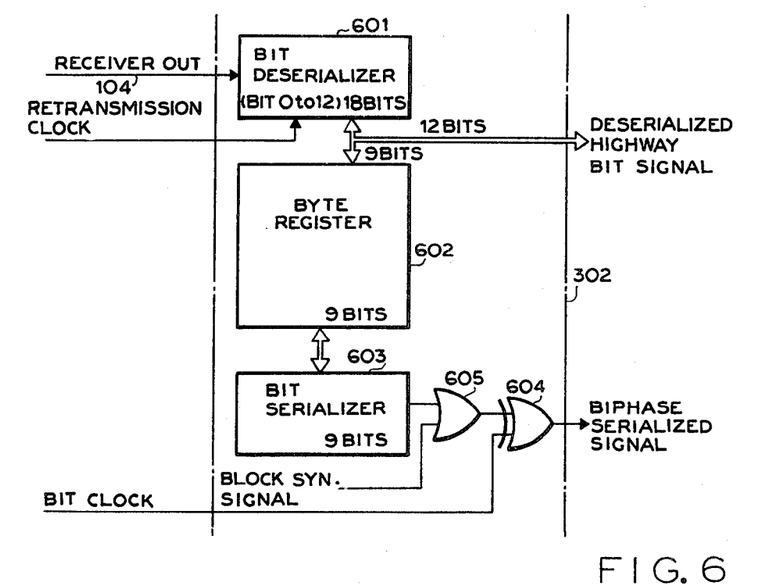
FIG. 6 is a block diagram showing a delay control device.

FIG. 6 is a block diagram showing one example of the construction of the delay controller 302 shown in FIG. 3. It includes a bit deserializer 601 constituted by a shift register containing 18 bits, each of which is designated by 0 to 17 with chaining order from input. More particularly, the leading and trailing portions of the phase transition point of the highway signal are sampled and shifted into the bit deserializer 601. The output from the even bits of the bit deserializer 601 are applied to a byte register 602. These signals correspond to the trailing half portion of the deserialized highway biphase encoded bit signals and each signal level itself represents high or low level corresponding to data "1" or data "0." In other words, the information of the highway biphase bit signal is judged only by the level of the trailing half portion instead of the phase transition whereby the information of the leading half portion is discarded except that it is used for block synchronizing signal detection.

The byte register 602 is constituted by a first-in first-out buffer register (FIFO) and contains enough number of bytes for buffering the frames A's bytes. These bytes are to be sent out in succeeded frame B's time slots. Therefore, its maximum number of bytes is equal to one frame length. More particularly, the FIFO has a capability of controlling by itself. The output of the byte register 602 is coupled to the bit serializer 603 which functions to convert a byte serial signal into a bit serial signal and is constituted by a nine bits shift register. The output NRZ signal from the bit serializer 603 is coupled to an exclusive OR-gate circuit 604 through an OR-gate circuit 605, together with the biphase encoding clock signal (50% duty) to be converted into a biphase encoded serialized signal. Thus, the received highway information in Frame A is ready for retransmission in Frame B.

Figure 7:
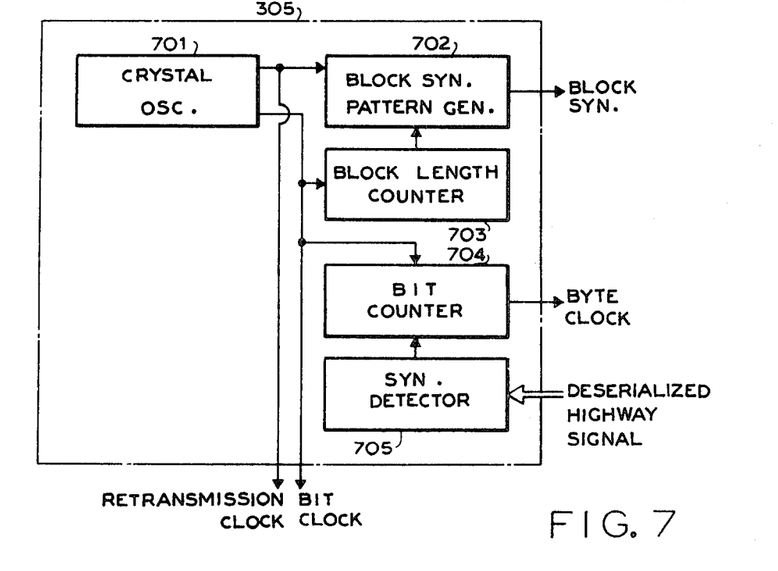
FIG. 7 is a block diagram showing the master synchronization controller of the central data station shown in FIG. 3.

FIG. 7 is a block diagram showing one example of the construction of the master synchronization controller 305 of the central station. It includes a crystal controlled oscillator 701, oscillating at a frequency of 4 MHz and its output is divided in two by a divider, not shown, associated with the oscillator 701 thus generating a 2 MHz signal which is used as the biphase encoding clock signal. This 2 MHz signal is further divided by two to form a 1 MHz bit clock signal.

The bit clock signal is applied to a block length counter 703 and the output carry signal thereof which is generated when it counts up an internal equal to the block length time, is used to excite a block synchronizing signal pattern generator 702.

The block synchronizing signal pattern generator 702 is constituted by a presetable shift register and serially output signals having a preset block synchronizing pattern, thus forming a block synchronizing signal as shown in FIG. 2b. These clock signals constitutes a biphase encoding clock signal.

A bit counter 704 is constructed to generate a byte clock signal each time it counts up 9 bits. This byte clock signal is used as the shift signal in the byte register 602 shown in FIG. 6. The clear signal to bit counter 704 comes from the output of synchronism detector 705 that detects out the block synchronizing pattern in the deserialized highway biphase bit signals.

Figure 8:
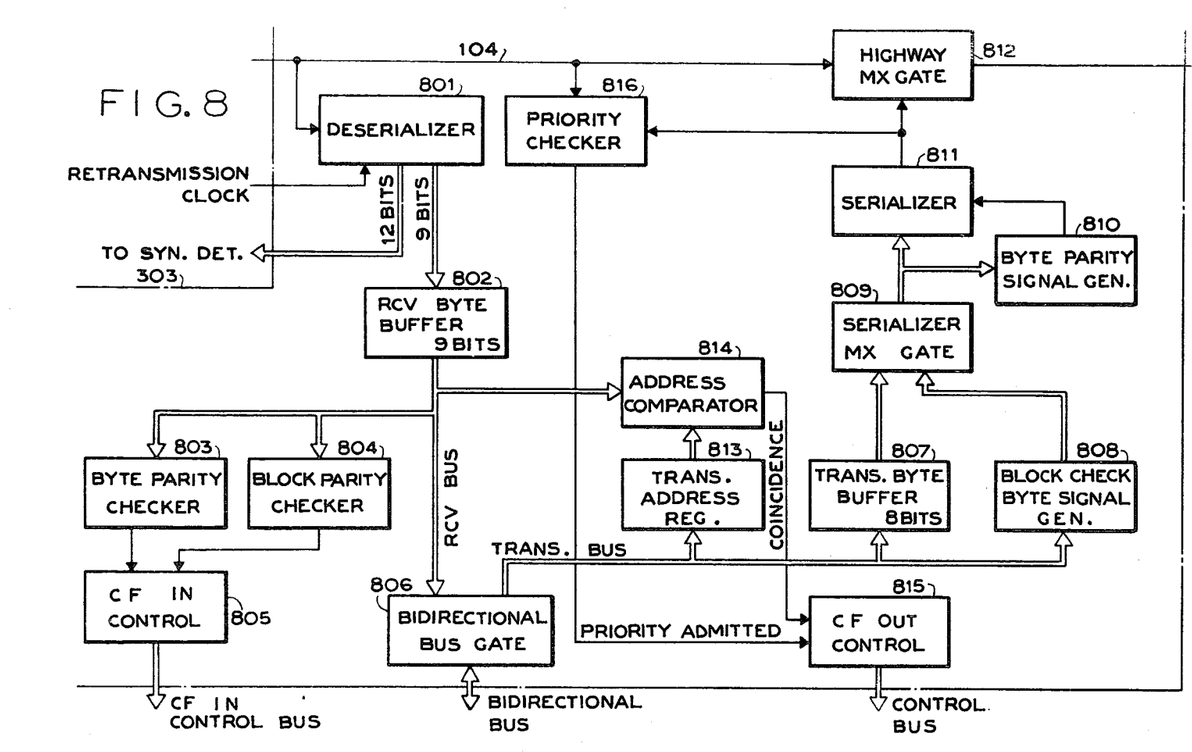
FIG. 8 is a block diagram showing the highway interface of the central data station shown in FIGS. 3 and 4.

One example of the construction of the highway interface 303 of the central data station 102 is shown in FIG. 8. The highway interface 403 of the local data stations 103 have a similar construction. The highway signal received from highway 104 is first applied to a deserializer 801 where it is converted into a bits parallel signal. This deserializer has the same circuits construction as the bit deserializer 601 already described in connection with FIG. 6. The outputs of nine even bits of deserializer 801 forming a byte are applied to receiving byte buffer 802 which temporarily stores a single byte of information received from the highway.

A byte parity checker 803 is provided to check at each byte if the 9 bits signal (comprising 8 data bits and 1 parity bit) received from the receiving byte buffer 802 constitutes an odd parity as a whole. Further, a block parity checker 804 is provided to check, at each frame, if the data bytes constitute an even parity longitudinally for whole bits including the bit of block parity byte received from the receiving byte buffer 802. There is provided a CF-IN control 805 for generating an output signal or a UF-IN control bus which controls the reception of the data of a frame in accordance with the outputs from the byte parity checker 803 and the block parity checker 804. This output signal has the form of parallel bit.

A bidirectional bus gate circuit 806 switches three signals, these signals being a signal from RCV bus, a signal to TRANS bus and signal to or from a bidirectional bus. These signals are directed according to their destination.

Information to be sent out to the highway through the bidirectional bus is temporarily stored in a transmission byte buffer 807 byte by byte. A block check byte signal generator 808 must be gated by a block check byte signal when the last one of the output signals from the transmission byte buffer 807 has been sent out. The outputs from the byte buffer 807 and the block check byte signal generator 808 are supplied to a serializer multiplexing gate circuit 809 so as to be multiplexed on the time division basis. A byte parity generator 810 is constructed to generate a parity bit in accordance with the output from the serializer multiplexing gate circuit 809 so that the bits as a whole have an odd parity, thereby forming a transmission byte of 9 bits by combining one parity bit and the output of 8 data bits from the serializer multiplexing gate circuit 809. There is provided a serializer 811 comprising a 9-bit shift resistor and providing a parallel-IN and a serial-OUT. There is also a circuit similar as that of Exclusive OR gate 604 which is used to generate a biphase signal. The output signal from the serializer 811 is multiplexed on the time basis together with a highway by passing signal and then sent out to the highway. The output signal of highway multiplexing gate circuit 812 includes all signals with the exception of all of or part of the PRC bits which imposed by the output of serializer 811 and the bytes of frame A inserted by those of serializer 811 when the data station is turned to the transmission mode on the other hand, when the data station remains in the receiving mode all the highway signals are passed by except those addressed to the station and destinated to send answerback informations in time slots of ASB.

A transmission address register 813 is constructed to store the address of a common interface which has originated a request signal, that is, the information sent out in the time slots of TAA when the station is switched to the transmission mode. The output from the transmission address register 813 is utilized to compare equality with the output of the receiving byte buffer 802 when used to hold the information of the time slots of TAB in address comparator 814, after the given station turned to the transmission mode in frame A and when a equality is detected a coincidence output is given to a CF-OUT controller 815.

Further, a priority checker 816 is provided to check if a highway 104 - IN signal contains a significant bit in the higher bit region of PRC corresponding to the priority level to be sent out from the serializer 811. For example, checking is done at a timing of the 8th bit representing the 8th priority level, if the data station wishes to send out data with the lowest priority level, that is 9th priority level shown in FIG. 2c, has first priority. If such a significant bit is recognized, the priority checker 816 does not turn to the transmission mode but remains in the receiving mode of the given information block. It is to be understood that the priority code is made up of 9 types of the signals each consisting of 9 bits and is determined such that the order of the priority code descends in the order of (111 ... 11), (011 ... 11) ... (000 ... 01) as shown in FIG. 2c. In other words, a data station which sends out "1" at a bit of a certain level has a transmission priority with respect to another data station which sends out "1" at a bit having a lower level. When a given data station does not recognize the significant bit in high level, then the priority checker 816 applies a priority admission signal to a CF-OUT controller 815. In response to the priority admission signal, the CF-OUT controller 815 encodes, a signal meaning that the occupation of an information block is possible and another signal meaning that the occupation of the information block was successful when a coincidence signal derived from address comparator 814 and the output of these encoded signals, are applied to the CF-OUT control bus.

Figure 9:
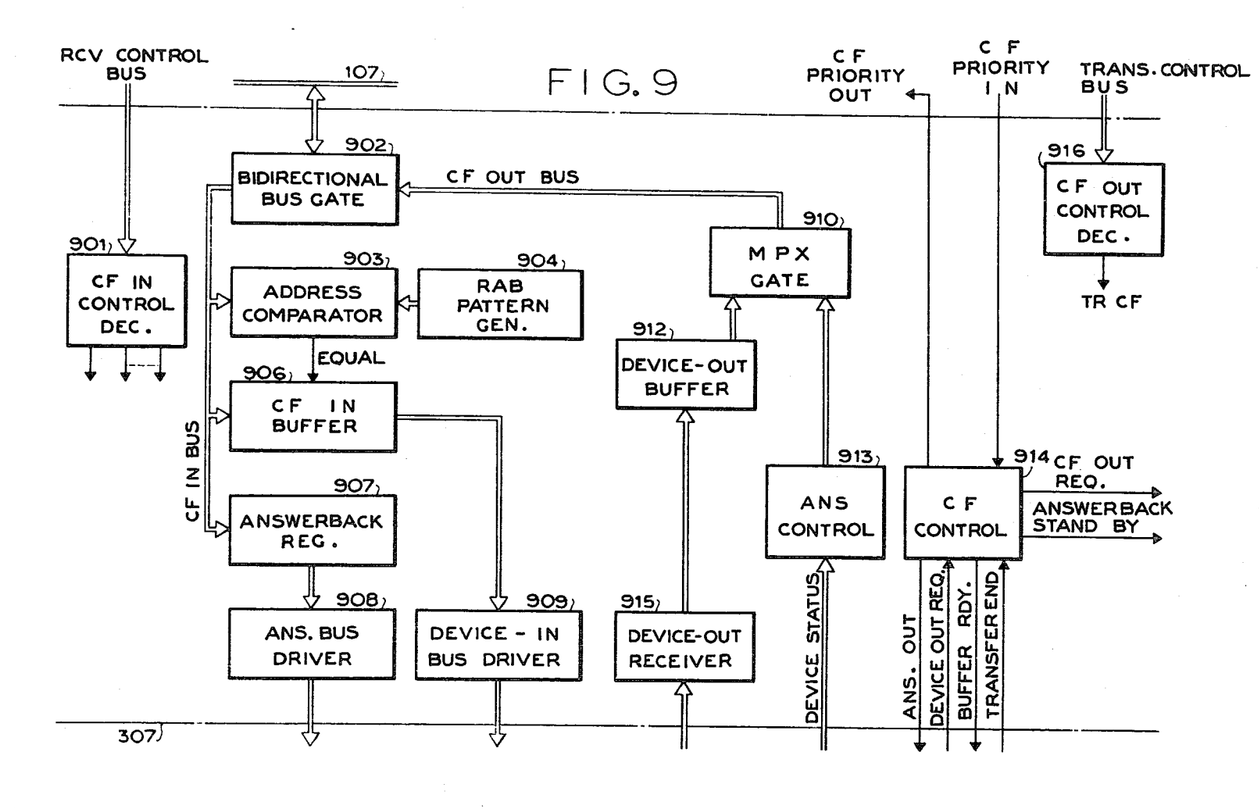
FIG. 9 is a block diagram showing the common interface of the central data station shown in FIGS. 3 and 4.

FIG. 9 is a block diagram showing one example of the common interface provided for the central data station 102 and the local data stations 103. It includes a CF-IN control decoder 901 which decodes the control signal received from the CF-IN control bus to form various CF control signals. Further, there is provided a bidirectional bus gate circuit 902 for transferring a signal received from the bidirectional bus operating to perform a time division multiplexing function according to the timing of the signal. The bidirectional bus gate circuit 902 has a timing to provide a bidirectional bus signal to a CF-IN bus and a timing for supplying the signal from the CF-OUT bus to the bidirectional bus 107. As has been pointed out hereinabove, the bidirectional bus 107 is connected between the highway interface 303 and the common interface 307 for distributing or selecting of the signal to be transferred to or from the common interface. A RAB pattern signal generator 904 is provided for generating a code signal to be coincided with the contents of RAB of the information block to be received. This code signal can be used as the address, for example, of a given common interface or a device connected thereto. In the case of the receiving mode, the RAB signal is received through the bidirectional bus gate circuit 902 and the CF-IN bus signal is compared with the output of an RAB pattern signal generator 904 by an address comparator 903 thereby producing an "equal" signal or a "not equal" signal.

A CF-IN buffer 906 is enabled by the equal signal from the address comparator 903, and in the receiving mode, the CF-IN buffer 906 stores the DBT bytes in series via the CI-IN bus. In the same manner, an answerback register 907 has a signal from the CI-IN bus applied thereto and stores the content of ASA of the succeeding information block after the transmission mode. The output from the answerback register 907 is converted to the bus drive level by an answerback bus driver 908 and is then sent to a bus. The output from the CF-IN buffer 906 is converted by a device-IN bus driver 909 to the bus drive level and is then sent to a bus.

On the other hand, a signal sent out from a corresponding device is converted to logic level by a device-OUT bus receiver 915 and then byte serially stored in a device-OUT buffer 912 as information to be inserted in the frame A of the information block. At the same time, an answerback control 913 stores the device status as answerback information to be inserted in the time slots of ASA when the device receives information. The output from the answerback control 913 is multiplexed on the time division basis together with the output from a device-OUT buffer 912 by a multiplexing gate circuit 910 and the multiplexed signal is gated to a bidirectional bus gate circuit 902 through a CF-OUT bus.

A CF controller 914 has a flip-flop to memoraize a device-OUT request signal from a device until the successful transmission has been recognized. Further, a CF-OUT control decoder 916 is provided to supply timing signals and control of transmission to be used in the common interface.

The above designated data highway system of this invention operates as follows.

1. Sending Out of the Synchronizing Signal from the Central Station

The bit clock signals generated by the crystal controlled oscillator 701 (FIG. 7) are counted by the block length counter 703. When this counter reached a predetermined number, the counter 703 generates a carry signal which is applied to the block synchronizing pattern generator 702 for presetting the block synchronizing pattern, whereby the next biphase encoding lock signal begins to serially shift out the block synchronizing signal. The signal shifted out by the synchronizing pattern generator 702 is applied to the exclusive OR gate circuit 604 (FIG. 6) through the OR gate circuit 605. After the block synchronizing pattern signal has been sent out, the output of the multiplexing gate circuit 605 remains at the lower level until bit serializer 603 is requested to output at the time slots of frame B. Accordingly, the exclusive OR gate circuit 604 produces only the biphase zero-bit signal. By the nature of the biphase encoded signal, the output of the exclusive OR gate circuit 604 governs the timing and clocking of not only the central data station but also of all local data stations.

2. Synchronization of Each Station with the Information Block

After being amplified by the receiver, the highway signal received by each station is applied to PLL 501 which generates the biphase encoding clock signal having a frequency of 2 MHz and receiver bit clock signal of 1 MHz. The biphase encoding clock signal is applied to the deserializer 601 for sampling the highway signal. The output of bits 0 to 17 of the deserializer are applied to the block synchronizing pattern detector 502 for searching the coincidence of the synchronizing pattern. Such coincidence is obtained when the bit 11 is sampled and a count clear signal is generated when the 17th bit of block synchronizing signal is received. This count clear signal is applied to the bit counter 503 and the byte counter 504 for clearing them. Upon receipt of the clear signal, the bit counter 503 begins to count the number of the bit clock signals and when it counts up to 9 bits, a byte count signal is produced.

The bit counter 503 consists of 9 bit shift register and discriminates a bit of the highway signal so as to arrange only a bit to become a "high" level. The output of the 9th bit in bit counter 503 is applied so as a carry to the byte counter 504 thus causing it to count up to 50 bytes. The counter 504 has the same construction as the bit counter 503 so as to discriminate the byte timing of the highway signal.

3. Device Data Transfer to Bidirectional Bus via Common Interface

When the "device-OUT request" from a certain device is received, the acceptance of the device data to the common interface is commenced. This device-OUT request is set in the CF control 914. At this time, if the device-OUT buffer 912 is "free," it is represented by a "buffer ready" signal, which is high so that the device data is enabled for transfer to the device-OUT buffer 912 via the device-OUT bus and the device-OUT receiver 915, thereby switching the "buffer ready" signal, low. Said device data contains a priority code (PRC) to be inserted into the information block, as "common interface address (RAA)" and the "device address" of the device and are attached beforehand by the device interface. The bytes are tranferred in accordance with the information block format. Immediately after the end of the tranfer of the device data, the device interface receives a "transfer end" signal. The priority given to the common interfaces is determined by a cascaded signal passing through the CF control 914. The cascaded signal includes the CF priority-IN and the CF priority-OUT signals. Accordingly, a common interface on the upper stream possesses the priority over this common interface. In the condition in which the CF-OUT request is high, the CF-OUT control decoder 916 applies a TRCF signal to the common interface to transfer the transmission data in byte serial manner where the first byte (PRC byte) is sent to the bidirectional bus 107 from the device-OUT buffer 912 through the multiplexing gate circuit 910 and the bidirectional bus gate circuit 902. As a result of sending the PRC byte, the RAA byte will be transferred provided that the CF-OUT control decoder 916 continues to produce the TRCF signal. When the last data is, the level of the "answerback standby" signal becomes high. As the level of the "transfer answerback" signal from the CF-IN control decoder 901 becomes high, the data of the CF-IN bus is stored in the answerback register 907 whereas an answerback OUT signal is applied to the device with the result that the contents of the answerback register 907 is transferred to the device via the answer bus driver 908 and the answer bus.

4. The Transmission of Signals from the Highway Interface to the Highway

In the highway interface, when the "CF-OUT request" signal has a high level, the TRCF is generated and enables shift of the priority byte to the transmission byte buffer 807 via the bidirectional bus and the bidirectional bus gate circuit 806. The priority byte is set in the serializer 811 via the serializer multiplexing gate circuit 809. Now the priority checker 816 checks to see if a "1" bit in higher priority level is sent out from an upper-stream station signal. If not, "1" bits from given priority level, are not at least one, for instance, from the highway multiplexing gate circuit 812 to the highway by generation of a "priority higher" signal from the priority checker 816. At this time if "1" is detected in the signal from the upper-stream station, it means that the upper stream station has priority over the given station so that the information to be sent out of the given station will not be able to be sent out, that is, these subsequent bytes from RAA will not be sent. As mentioned above, in response to "priority higher" signal, the CF-OUT control 815 switches to the transmission mode so as to successively send out bytes from RAA.

Although signals succeeding to the RAA byte are successively sent to the highway in the same manner as the PRC byte, the byte parity signal generator 810 adds an odd parity bit to each byte. Furthermore, following the last device data byte, a block check byte generated by the block check byte generator 808 is added. The TAA byte is stored in the transmission address register 813 concurrently with the application thereof to the highway.

5. Reception of Highway Signal via Highway Interface
5a. The Transmission Mode

Information sent out to the highway in the frame A by a certain data station circulates through the highway and then received by the same station in frame B as a highway-IN-signal provided that there is not transmitting data station down-stream. The highway signal is sampled by a biphase encoding clock signal, synchronous therewith, and having a frequency twice that of the highway bit signal, and is then shifted-in into the deserializer 801. Bit 0 to 11 signals of the shift register are sent to the synchronizing pattern detector 12, whereas even bit (9 bits) signals are transferred to the receive byte buffer 802. The output from the byte buffer 802 is checked if it becomes odd parity at the byte parity checker 803.

After sending out the bytes in frame A and at the time of receiving the TAB byte, the output of the receive byte buffer 802 and the output of the transmission address register 813 are compared by the address comparator 814. When these two outputs coincide with each other, the given common interface is proven that it has the highest priority whereby the occupation of the information block is completed over the entire highway to accomplish transmission. Further, the CF-IN control 805 applies a TR answerback to the CF-IN control bus. The answerback information is sent to the bidirectional bus through the RCV bus and the bidirectional bus gate circuit 806.

5b. Receiving Mode

A highway-IN signal to be received is transferred to the common interfaces through the deserializer 801, the receive byte buffer 802, the bidirectional bus gate circuit 806 and the bidirectional bus gate 902, as has been described before. However, in the receiving mode, at the last byte of the data in frame B, a check is made as to whether the output from the block parity checker 804 is the result of the even parity or not, and the result of the check is applied to the receive control device 805. If the reception is correct, the receive control device 805 generates an output of the "CF-IN request."

6. Transfer of the Signal to the Common Interface from the Highway Interface

6a. Receiving Mode

The receiving data applied to the CF-IN bus from the bidirectional bus gate circuit 902 is compared with the data generated by the RAB pattern generator 904 with respect to the RAB byte by the address comparator 903 whereby an "EQUAL" signal is produced upon coincidence. At this time, if the CF-IN buffer 906 is free then it successively accepts the data from the CF-IN bus. On the other hand, if the CF-IN buffer 906 is not free it will not accept the data.

The data stored in the CF-IN buffer 906 is then transferred to a corresponding device interface through the device-IN bus driver 909. As a response of transferring the data to the device interface, "DV status" signals are coming into the answerback control device 913 from the device interface to organize answerback codes to be sent to the bidirectional bus through the multiplexing gate circuit 910, the CF-OUT bus and the bidirectional bus gate circuit 902.

6b. Transmission Mode

The received answerback codes are stored in the answerback register 907, while it is being transferred from the CF-IN bus, and then transferred to the device interface through the answerback driver 908.

Figure 10A:
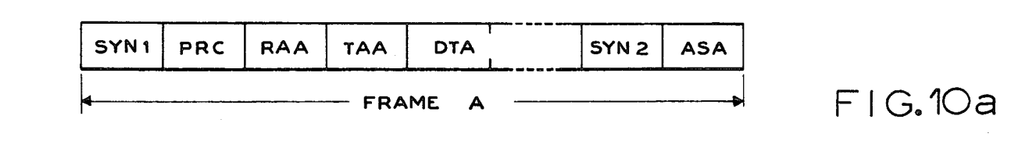
FIGS. 10a and 10b show block diagrams showing another formats of the information block applicable to the data communication system of this invention.

In the novel transmission system of this invention, when the transmission is made by utilizing the information block of the format shown in FIG. 10a, a reception out of synchronism of the transmitted signal can be detected with high reliability. This format of the information block is the same as that of the information block shown in FIG. 2a except that a second synchronizing signal SYN2, having a predetermined time relationship with respect to the first synchronizing signal SYN1, is interposed between the data DTA of frame A and the answerback ASA. The second synchronizing signal SYN2 is extracted at a station which receives the data and when the signal SYN2 is detected at a predetermined timing, it is used as a certification that the data DTA has been received without any out of synchronism at the receiving station. When the signal SYN2 is not recognized at the predetermined timing it is assumed that the data has been erroneously received without synchronism. Such check of synchronization is extremely effective to prevent operation failure based on erroneously received information.

Figures 10B, 11:
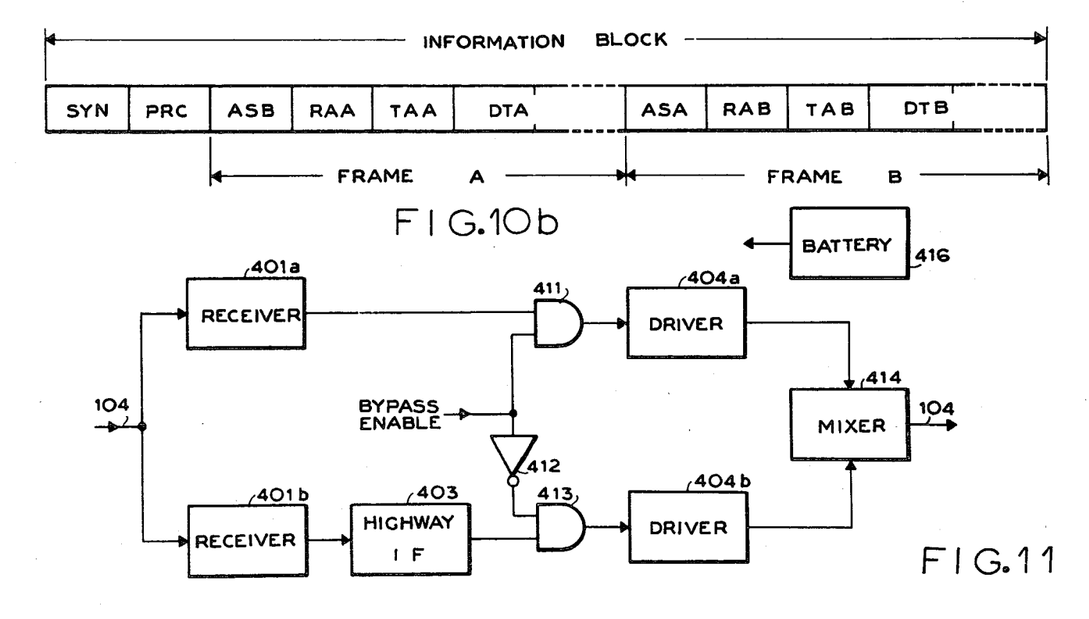
FIG. 11 is a block diagram showing a modification of the station shown in FIG. 4 having a main route and a bypass route backing-up therefor.

Alternatively, the transmission format as shown in FIG. 10b is also effective for the same purpose.

This invention also contemplates to provide an approach for improving the reliability of the data highway communication system. In the communication system such as an on-line information system or a process control system, the system downstream of the communication system could cause heavily damage or stoppage to the system. Therefore, it is necessary that the communication system, utilized in the system as described above, should function so that the transmission system is not affected by a partial failure in the system such as a down in a station or device so that the system can continue its operations by isolating defected part.

The station shown in FIG. 11 has the same construction as that shown in FIG. 4 with the exception that there is provided a by-pass route which comprises a receiver 401a, AND-gate 411 and driver 404a, in addition to a main route comprising a receiver 401b, highway interface 403, AND-gate 413 and driver 404b. The down-stream ends of the main and by-pass routes are mutually connected at a mixer 414 comprisng a hybrid transformer, for example. The output signal of the driver 404b is supplied to the highway 104 via the mixer 414 when the main route normally operates. If the main route gets into trouble, the output signal from the driver 404a is supplied to the highway, thereby providing a backup to the main route.

The input signal delivered through the highway 104 is supplied both for receiver 401a and receiver 401b. The detailed description of the receiver 401b and highway interface 403 is omitted in order to avoid repetition. The output of the highway interface 403 is led to one of the inputs of the AND-gate 413. The logical level of a bypass enable signal is kept low when the operation of the main route is detected as being normal, so that the other input of the AND-gate which is connected to the output of an inverter 412 is kept at "high" level. In this state, the output of the highway interface 403 passes through the gate 413 and is supplied to the driver 404b. The driver 404b acts to amplify the input signal to the level necessary for driving the highway 104 and delivering it to the highway 104 via the mixer 414.

On the other hand, the output signal of the receiver 401a is fed to one of the inputs of the AND-gate 411, the other input being supplied with the bypass enable signal. In the normal state, the logical level at the other input of the AND-gate is kept low and the signal from the receiver 401a is blocked at the AND-gate, so that the driver 404a generates an output signal of a constant voltage. Preferably, the driver 404a comprises a phase lock loop of a conventional type for bit synchronization and a digital regeneration circuit and is so adjusted as to have coincidence with phase between the output signals in the main and bypass route.

Failure in the main route includes a power down at main power source and poor output from the driver 404a and may be monitored by means of a conventional voltage level detection circuit. The signal causing any failure in the main route is activated to turn the logical level of the bypass enable signal to "high." The high level signal is inverted by the inverter 412 and the low level signal thus generated is led to the AND-gate 413 to block the signal from the highway interface. At the same time the AND-gate 411 is gated by the high level bypass enable signal. Therefore, the output signal from the receiver is allowed to pass through the AND gate and is sent to the highway through the driver 404a and mixer 414. When the bypass route is in operation, the station cannot perform data processing, but relays the highway signal from the upstream data station to the down-stream data station.

Preferably, there is provided an electric battery 416 which supplies an electric power to all components of the bypass route and provides means for detecting and generating the bypass enable signal in order to keep the operation in the bypass route when the main power source has failed.

Figure 12:
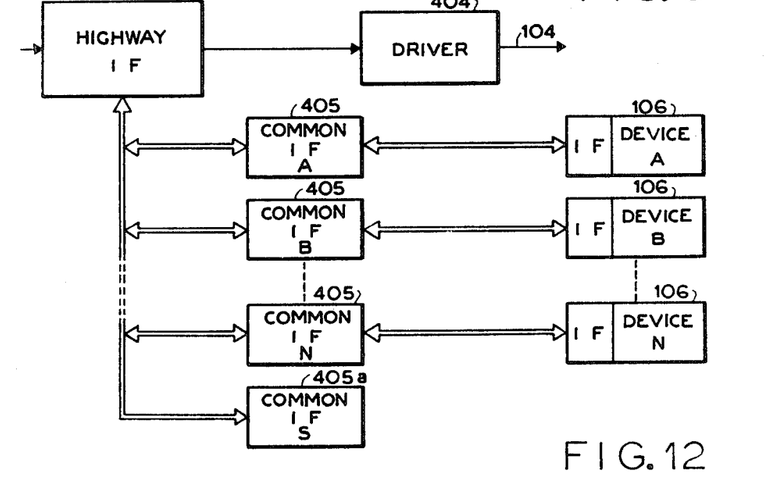
FIG. 12 is block diagram showing a still another modification of the station shown in FIG. 4 having a reserved common interface.

FIG. 12 shows another modification of the station shown in FIG. 4, which further comprises an additional or reserved common interface 405a having a same function to another common interface 405. The reformation of the system by exchanging the troubled common interface 405 to the reserve interface 405a may be preformed by means of a manually or automatically operated switch or by directly replacing the cables to the reserved common interface 405.

In general, the reliability of the communication system will be improved by providing only one reserve common interface so as to minimize the down time. The cost required for the additional common interface is very low in comparison with that of duplicating the whole device in the system.

What is claimed is:

1. A data communication system comprising:
a plurality of data stations including a central data station;
a transmission line connecting said data stations serially in a loop; said data stations including:
means for transmitting time slotted signals unidirectionally over said transmission line from one station to the next successive station; said central data station including:
means for organizing a plurality of generated time slots into an information block wherein said information block includes a block synchronizing signal, a first frame and a second frame; each of said other data stations including:
means for inserting information into said first frame, means for transmitting said inserted information in said first frame, and means for receiving information contained in said second frame; and said central data station including:
means for retransmitting in the second frame information received in the first frame.

2. The data communication system according to claim 1 wherein each of said data stations except the central data station includes means for inserting and transmitting answerback information when information in the second frame is received by one of said data stations into a time slot for answerback transmission which is provided at the final portion of said second frame, and means for receiving and extracting answerback information from the time slot having answerback information being provided at the final portion of the first frame immediately following said information block, wherein said central data station includes means for retransmitting the content of said time slot for answerback transmission which is provided at a time slot for answerback receiving that is disposed at the final portion of said first frame immediately following said information block.

3. The data communication system according to claim 1 wherein each one of said stations includes means for storing the information inserted and transmitted by itself into said first frame, and means for confirming the completion of the occupation of the information block by having the coincidence of the contents of said inserted information and of the information received at the second frame of the information block.

4. The data communication system according to claim 1 wherein each one of said stations includes means responsive to an occupation request of an information block for inserting a transmission address into said first frame, means for storing said transmission address of said first frame, means for checking the information coincidence of the content of said stored transmission address of said first frame and the content of the transmission address received in the second frame and means responsive to the result of checking for deciding that the occupation of the information block has been completed.

5. The data communication system according to claim 1 wherein each station comprises means for forming a priority code to be inserted into and transmitted by its own time slot provided at the front portion of the information block under the control of a priority level when the occupation of said information block is controlled according to priority, means for extracting priority information received from said transmission line which has been inserted into said time slot and means for comparing said extracted priority information with the priority code to be sent from said data station, means for sending said priority code to be sent from said data station to said transmission line instead of relaying the information of the received time slots when said station is judged to have a high order of priority by said comparison means, whereas sending the received time slot information to said transmission line when it is judged that said station has a lower level of priority, and means for occupying said information block.

6. The data communication system according to claim 2 wherein said central data station includes means for inserting a synchronism check signal in a position in front of the time slot of said answerback information and wherein each of the data stations other than said central data station includes means for inserting answerback information in said time slot for the answerback information after confirmation of the synchronism by said synchronism check signal.

7. The data communication system according to claim 1 wherein each station other than the central station includes means for inserting answerback information in the time slot for sending out answerback information in the front portion of the first frame of an information block after confirming synchronism by detecting the synchronizing signal of the next information block after said station has received the second frame information as the information directed to itself, and wherein said central data station includes means for retransmitting information in said time slot by using the time slot at the front portion of the second frame for receiving the answerback information and said station which sends out its own information at the first frame includes means for receiving the answerback information from the time slot of said second frame of the immediately following information block.

8. The data communication system according to claim 7 further including means for using said synchronism check signal as the block synchronizing signal.

9. A loop data communication system comprising:
a plurality of data stations including a central data station and a transmission line mutually connecting said stations to form a loop; each of said stations including:

means for performing data communication using an information block as a minimum unit by inserting information into time slots of a first frame of said block at the time of transmission of information and by extracting information from time slots of a second frame of said block; said central data station further including:

means for generating and transmitting time slots and for organizing information blocks, means for receiving the signal in said first frame of said block, means for delaying said received signal in said receiving means, and means for retransmitting said delayed signal in time slots of said second frame; each of said data stations, except for said central station, further including:

means for monitoring the state of a main route including said data communication means and for generating an output indicating when a failure is detected, a bypass route which is connected in parallel to said main route and capable of relaying said transmission line signal, means for blocking output signals of said main route and for enabling the output signal of said bypass route when an output indicating a failure is activated and a hybrid transfomer with input terminals connected to said main and bypass routes and with an output terminal connected to said transmission line.

10. The data communication system according to claim 9 wherein each of said data stations includes common interfaces, each of which is connected to a device through a bidirectional bus and further includes a reserved common interface which is connected to one of said devices when the corresponding common interface has failed.

* * * * *